United States Patent
Graff

[15] 3,678,254
[45] July 18, 1972

[54] MISSING CONTAINER DETECTOR
[72] Inventor: William R. Graff, Lynchburg, Va.
[73] Assignee: Simplimatic Engineering Co., Lynchburg, Va.
[22] Filed: Nov. 18, 1970
[21] Appl. No.: 90,620

[52] U.S. Cl. ........................235/92 PK, 235/98, 250/223 R, 235/92 PE, 235/92 R, 340/280
[51] Int. Cl. ......................................................G06m 7/00
[58] Field of Search.............235/92 PK, 92 PE, 92 V, 92 FP, 235/92 EA, 98; 250/222, 283 R; 340/280, 419; 198/40; 221/7

[56] References Cited

UNITED STATES PATENTS

| | | | |
|---|---|---|---|
| 3,472,374 | 10/1969 | Ness et al. | 340/280 X |
| 2,142,920 | 1/1939 | Rose | 250/223 X |
| 2,529,081 | 11/1950 | Hughes et al. | 250/223 X |
| 2,975,969 | 3/1961 | Stoeckel et al. | 235/98 |

Primary Examiner—Maynard R. Wilbur
Assistant Examiner—Joseph M. Thesz, Jr.
Attorney—James and Franklin

[57] ABSTRACT

A control apparatus for a missing container detector comprises a photoelectric cell mounted on a suitable frame at a control station along a conveyor belt for sensing the presence of a case at said control station, a plurality of container sensing heads, one for each lane, mounted above the conveyor belt and adapted to sense individual containers as they pass thereunder, and a control circuit for indicating when a case is missing one or more containers. The control circuit comprises a binary counter responsive to proximity switches associated with said sensing heads and effective to register a count for each full row of containers which passes under said sensing heads and means operatively connected to said photoelectric cell and effective upon the movement of a case past said control station to produce an output signal if the count registered in said counter is less than a predetermined number. The output signal may be used to sound an alarm, eject a case, and/or stop the conveyor. Means are provided for adapting the circuit for cases of different shapes and sizes.

30 Claims, 10 Drawing Figures

INVENTOR
WILLIAM R. GRAFF

BY *James and ...*

ATTORNEY

INVENTOR
WILLIAM R. GRAFF

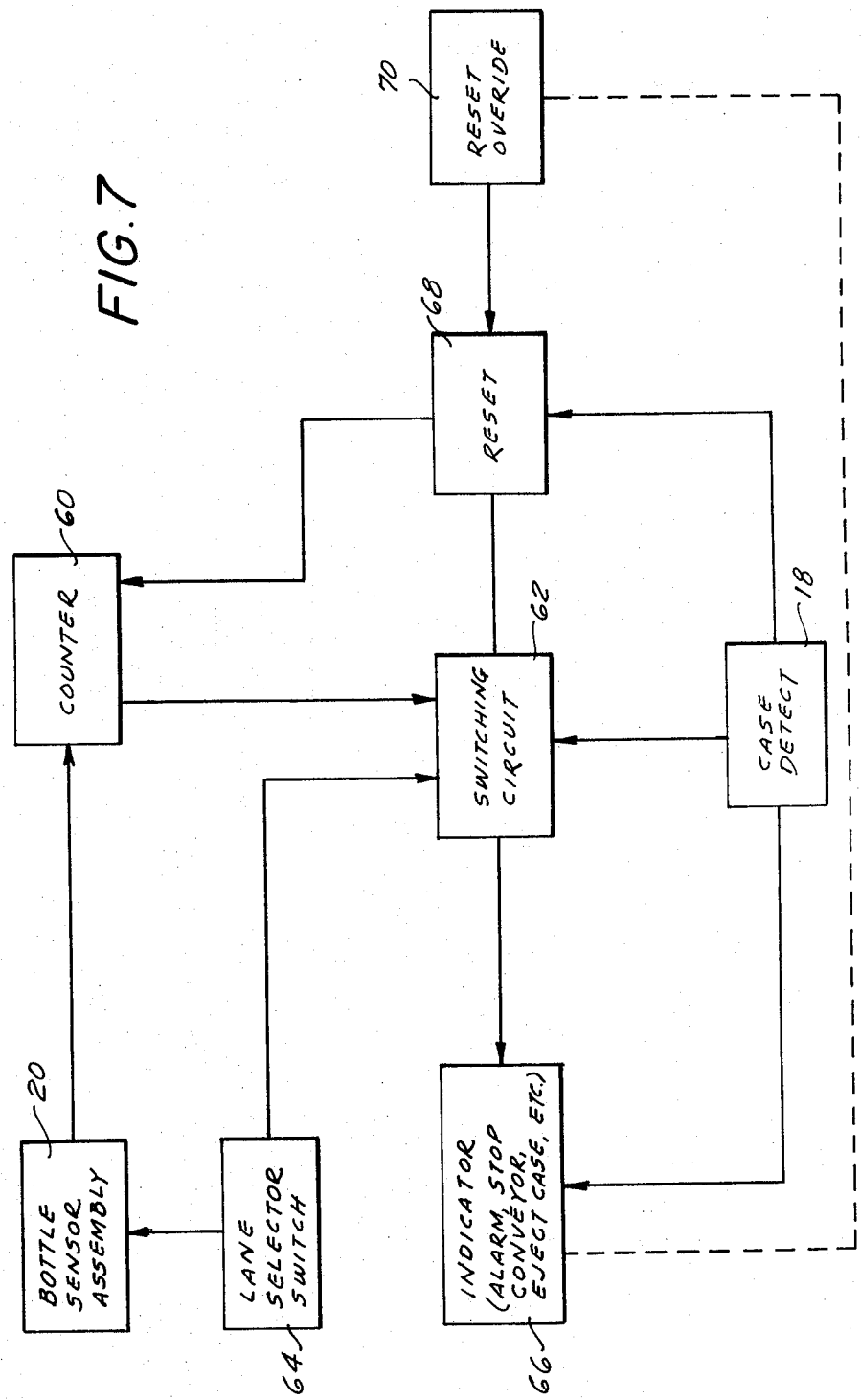

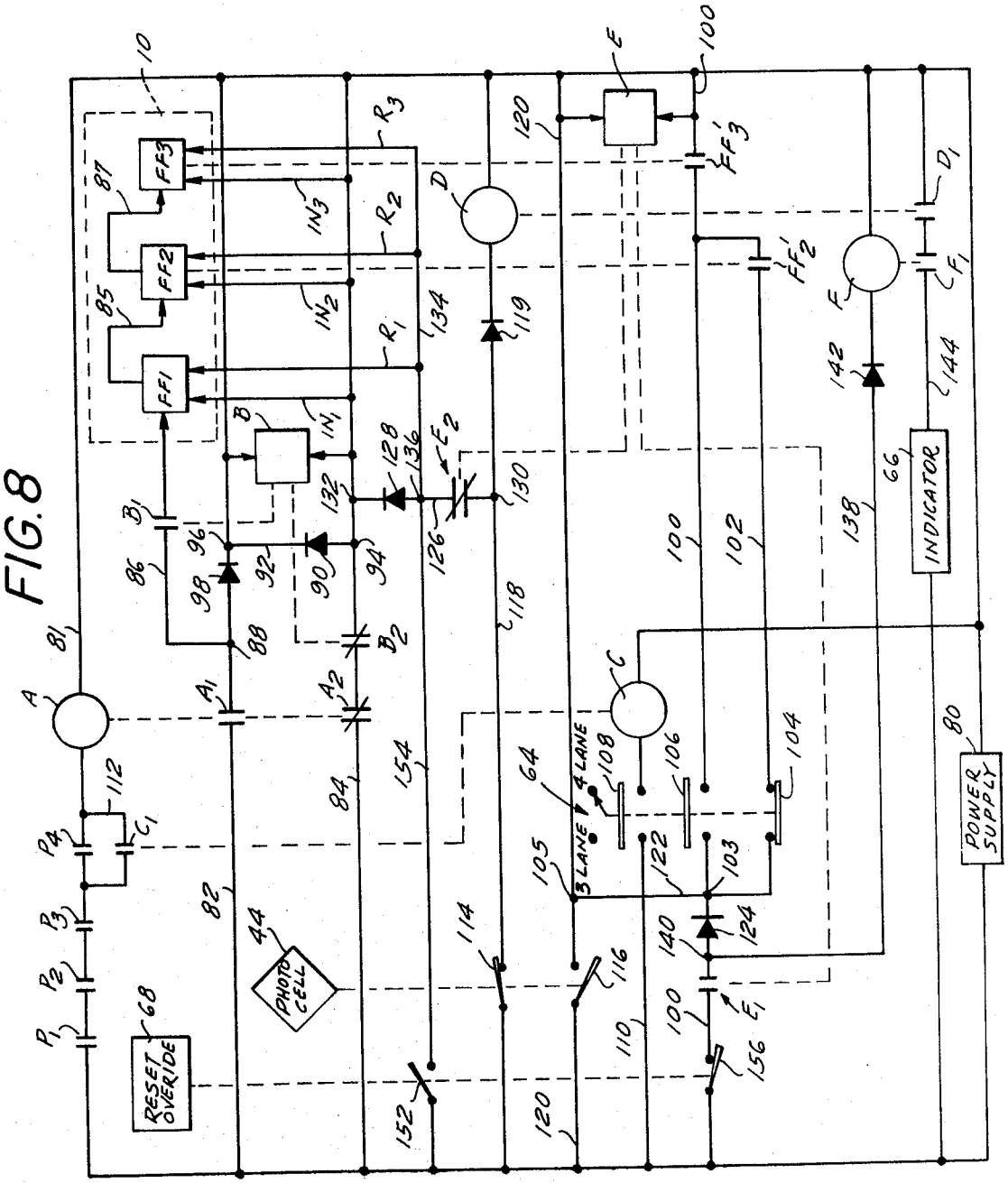

MISSING CONTAINER DETECTOR

This invention relates to apparatus for inspecting cases filled with containers and detecting those cases which are missing one or more containers. More particularly the present invention relates to a control apparatus and circuit for determining whether cases moving past a control station contain a given number of containers, and providing an indication when a case having less than said number of containers leaves said control station.

Many consumer goods, particularly foods and beverages, are today packed in individual containers such as glass bottles, jars, cans or the like. Normally such packaged goods are shipped to the retailer in cases containing a given number of containers, commonly 12 or 24. The cases are specifically designed to receive said given number of containers, often in individual partitioned compartments, and the packing thereof with full containers is often accomplished by completely automated case packing mechanisms. As a result it is not infrequent, because of machine malfunction or, in the case of hand packing human error, that a case is passed along the production or shipping line without being completely filled with the required number of containers. Because the cases are also normally closed and sealed by automated machinery without human intervention, cases are often shipped by the manufacturer without the required number of containers therein. The frequency of such mishaps causes significant embarrassment and difficulty for all involved, particularly since the merchandise may be transferred through several parties and stored for substantial periods of time before the case is opened by the retailer for sale or, more importantly, by the ultimate consumer who buys in bulk.

The use of manual detection means to obviate this problem detracts substantially from the economies inherent in completely automated case packing machinery. Moreover, effective manual inspection is far from foolproof in that it depends totally upon the constant attention of the inspector who will normally be an unskilled laborer. Thus, human error substantially reduces the effectiveness of this method.

Automatic detecting devices for detecting missing containers in a case have been designed in the past. However, such apparatus has heretofore normally been designed only for specific applications, i.e. for use with a case of a specific size, shape and capacity and containers of a given configuration. Accordingly, often the expense involved in designing and manufacturing such apparatus for such a limited range of use is not justified by the savings in labor cost. Moreover, prior art apparatus of the type described is unduly complex, unreliable and may require frequent adjustment. Thus, the means for sensing individual containers in a case is normally geared to a particular spacing of the containers therein. If, as often happens when the cases are packed automatically, the containers in a full case are distributed slightly unevenly therein, that lack of uniformity in distribution may cause the sensors to provide an erroneous signal, resulting in a "missing container" output from the control circuitry when in fact no container is missing. In addition, prior art control circuits of this type are designed to stop the conveyor immediately upon sensing a missing container. Thus the case must be manually removed from the control station before the conveyor is again activated, a process which must be carried out with considerable care to avoid interference with the control apparatus at the control station. As a result, substantial delays and labor costs cannot be avoided.

Accordingly, it is a primary object of the present invention to provide a reliable apparatus for readily detecting missing containers in cases rapidly moved along a shipping line by conveyor means or the like.

It is a further object of the present invention to provide control apparatus of the type described in which means are provided at a control station to sense the number of containers in each case passing said control station and means to provide a control signal upon passage of any case therethrough containing less than the required number of containers.

It is yet another object of the present invention to provide control apparatus of the type described including means to sense the presence of a case at said control station and in which the operative output signal for indicating a missing container is produced only after the case has fully passed beyond the control station regardless of the particular location within the case at which the container is missing.

It is still another object of the present invention to provide control apparatus of the type described which is readily adaptable to a wide variety of shapes and sizes of the cases and/or containers with which it can be used.

It is yet another object of the present invention to provide control apparatus of the type described which is designed to reliably indicate when a case is not completely full regardless of the spacing of the containers therein.

It is a further object of the present invention to design control circuitry for control apparatus of the type described which is responsive to the total number of containers within a case passing a control station.

It is still another object of the present invention to provide control circuitry of the type described which is effective to count the number of full rows of containers traversing a control station in a plurality of lanes and having means to readily adapt the circuit for operation with cases having a different number of lanes and/or rows.

To these ends the present invention provides means for use with a conveyor belt or the like for sensing the presence of a case at a control station and means to sense individual containers disposed in said case as the case moves past the control station. The articles (containers) are counted and an indicator means in the form of an alarm, means to stop the conveyor and/or means to eject the case is actuated as the case passes beyond the control station. For this purpose a control circuit is provided, said circuit generally comprising a counter responsive to the container sensing means, a switching circuit responsive to the count in said counter and the case detect means, and a reset circuit responsive to said case detect means and effective to automatically reset the counter as a case leaves the control station.

The switching circuit is designed to actuate an indicator circuit and disable the reset circuit when a case leaves the control station if the count registered in the counter is less than a predetermined number. In a preferred embodiment the counter is designed to register one count for each full row of containers passing the control station, a container sensor being provided for each lane. The circuit is provided with a selector switch for adapting the circuit to cases having a different number of rows and/or lanes. A reset override mechanism as adapted to override the switching circuit to enable the counter to be reset once a non-full case has been detected and appropriate action has been taken.

While the preferred embodiment is here disclosed for use with cases of capped bottles, it will be appreciated that the apparatus is equally useful with other types of containers or, indeed, with any articles arranged in discrete groups, the sensors being appropriately designed in accordance with the articles to be sensed.

To the accomplishment of the above, and to such other objects as may hereinafter appear, the present invention relates to a missing container detector and control circuitry therefor, all as defined in the appended claims and as described in this specification taken together with the accompanying drawings in which:

FIG. 7 is a simplified block diagram generally showing the operation of the control apparatus of the present invention;

FIG. 8 is a simplified schematic diagram illustrating with more particularity the operation of the control circuit of the present invention;

FIG. 9 is a tabulation illustrating the counting operation of the binary counter shown in FIG. 8.

The control apparatus herein described is adapted for use with articles of packaged merchandise such as that contained in bottles, jars, cans, etc. The particular embodiment here disclosed is described for use with cases containing 12 or 24 capped bottles arranged in rows and lanes of 3 × 4 and 4 × 6, respectively. Normally such cases are packed by automated machinery with the required number of bottles and are moved along a conveyor means to be loaded for shipping.

Figure 1:
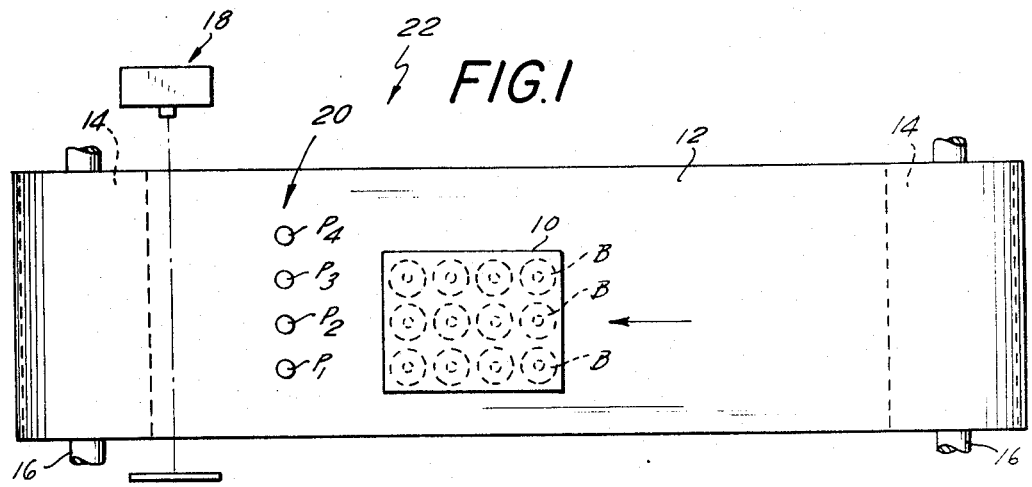
FIG. 1 is a schematic illustration of a case of bottles moving on a conveyor belt past a control station, the case containing 12 bottles.
Figure 2:
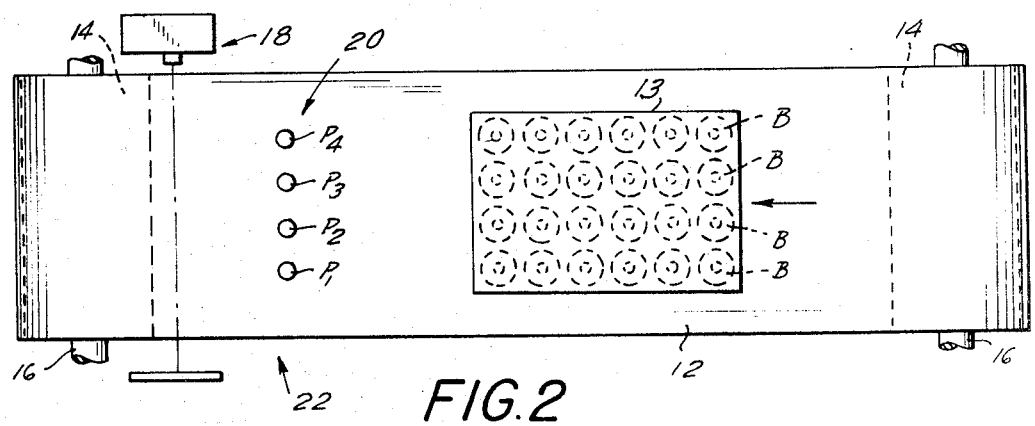
FIG. 2 is a schematic illustration similar to FIG. 1 showing a case having 24 bottles.
Figure 3:
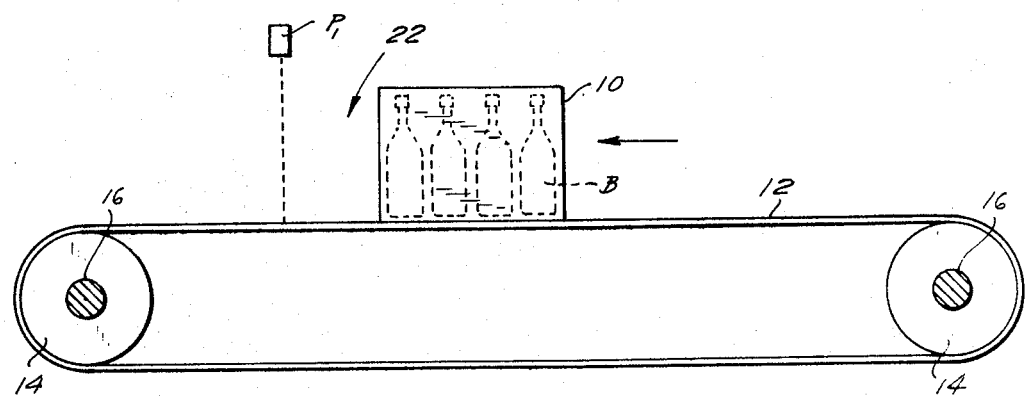
FIG. 3 is a side elevational view of the schematic illustration of FIG. 1.

FIGS. 1 and 3 schematically illustrate a case 10 containing 12 bottles B moved along a conveyor belt 12 in the direction of the arrow 15, the bottles being arranged in three lanes of four bottles each. The conveyor belt is driven through suitable means such as rolls 14 mounted on shafts 16 driven by a suitable motor (not shown). FIG. 2 shows an identical arrangement utilized with a case 13 containing 24 bottles arranged in four lanes containing 6 bottles each. In accordance with the present invention a case sensing means generally designated 18 and a bottle sensing means generally designated 20 are provided at a control station generally designated 22 positioned along conveyor belt 12. In the preferred embodiment here illustrated bottle sensing means 20 comprises four individual bottle sensors designated P1 through P4 respectively, sensor P4 being used only in connection with cases containing 24 bottles (four lanes).

CONTROL APPARATUS

Figure 4:
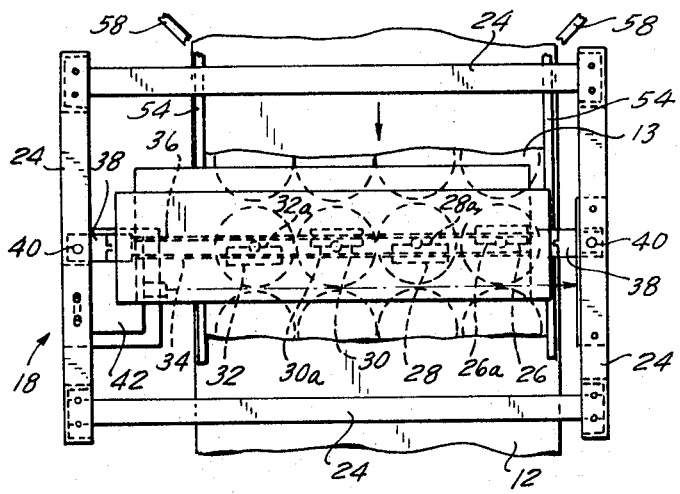
FIG. 4 is a top plan view of the control apparatus of the present invention positioned along a conveyor belt with a fragmentary view of a case of bottles passing thereunder.
Figure 5:
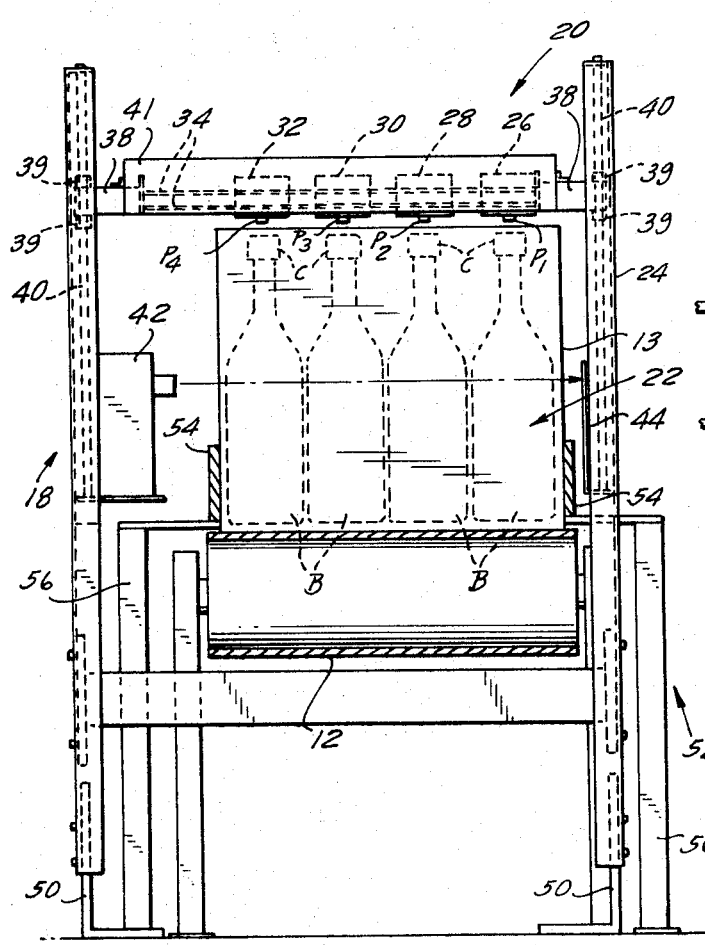
FIG. 5 is a front elevational view of the apparatus of FIG. 4.
Figure 6:
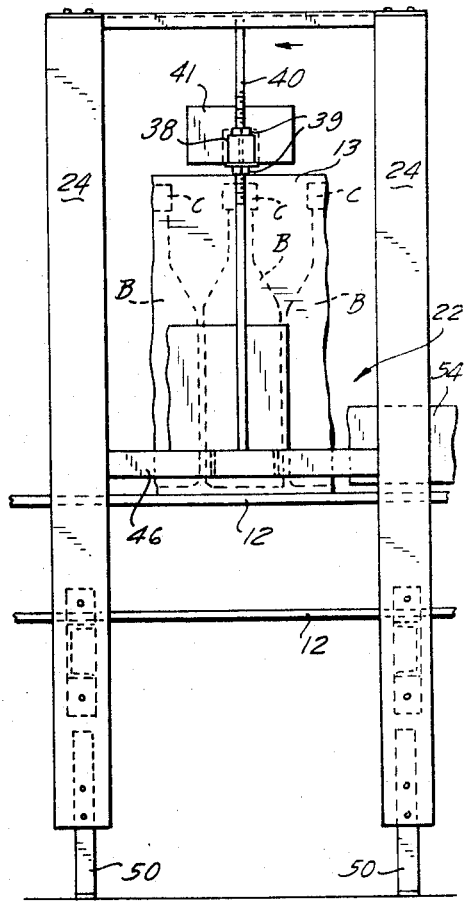
FIG. 6 is a side elevational view of the apparatus shown in FIG. 4.

Turning now to FIGS. 4–6, there is shown a detailed representation of the apparatus of the present invention. As there shown a frame generally designated 24 provides a support for both the bottle sensing means 20 and the case sensing means 18. Individual bottle sensors P1 through P4 are mounted on adjustable mounting blocks 26, 28, 30 and 32 respectively. As best shown in FIGS. 4 and 5 mounting blocks 26 through 32 are each provided with two longitudinally extending apertures and are slidably mounted by means of said apertures on two pairs of parallel support rods 34 and 36. Thus, mounting blocks 28 and 32 are mounted on rods 34 and mounting blocks 26 and 30 are mounted on rods 36, rods 34 and 36 being spaced to provide the staggered relationship illustrated in FIG. 4. The individual sensors P1–P4 are mounted in offset relationship on their respective mounting blocks such that they are in substantial alignment transverse to conveyor belt 12 as viewed in FIG. 4. The inner surfaces 26a, 30a of blocks 26 and 30 are slightly spaced from the oppositely facing inner surfaces 28a, 32a of blocks 28 and 32 to provide clearance therebetween. As a result of this arrangement sensors P1–P4 may be moved as close together as desired simply by sliding blocks 26–32 along rods 34 and 36 into overlapping relationship.

Rods 34 and 36 are mounted at either end in support blocks generally designated 38. As best shown in FIG. 6, support blocks 38 are slidably mounted on vertical adjusting rods 40 thereby providing height adjustment for the rods 34, 36 and sensor blocks 26 through 32, blocks 38 being maintained at any desired height by suitable means such as nuts 39 threadedly mounted on rods 40 (which for this purpose are externally threaded). A suitable cover 41 is provided to protect the entire bottle sensor assembly 20 from dust, dirt, etc.

As best shown in FIG. 5 case sensing mechanism 18 comprises a suitable light source generally designated 42 mounted on one side of conveyor belt 12 and a photoelectric cell in the form of a light-sensitive panel generally designated 44 mounted at the opposite side of conveyor belt 12 in opposing registration with light source 42. Both light source 42 and photoelectric cell 44 are mounted on suitable cross bars 46 (FIG. 6) which in turn are mounted at either end on frame 24 by suitable means (not shown). If desired cross bars 46 may be provided with suitable means (i.e. a slot and nut) to provide height adjustment of these members on frame 24. In addition the entire frame may be height adjustable as by adjustable legs 50.

Thus the apparatus is capable of standardized manufacture, and may be installed in a given plant and readily adapted to the particular conveyor installation already in use.

In operation frame 24 is placed at the desired location along conveyor belt 24 and the bottle sensor assembly 20 is adjusted to the proper height on frame 24 and locked in position. FIG. 5 schematically illustrates case 13 containing four lanes of bottles B (i.e. a 24-bottle case) disposed in operative position under the bottle sensing assembly 20. Prior to commencing operation of the control apparatus mounting blocks 26–32 are accordingly slidingly adjusted along rods 34, 36 to bring sensing heads P1–P4 to a spacing corresponding to the lateral spacing of the bottles B within the case 13. In a preferred embodiment of the invention sensing heads P1–P4 are proximity limit switches adapted to sense the metallic caps C on bottles B. Each of these switches is in essence a temperature compensating balanced inductance bridge having two active coils. When a ferromagnetic object is placed within the range of the sensor the reluctance in the flux path linking the two coils is reduced, thereby unbalancing the bridge and producing a voltage output which closes the switch contacts. Thus, if a bottle having a metal cap or foil passes under one of the switches P a contact is closed. These proximity switches with proper adjustment for sensitivity, could detect any metal-bearing article. In accordance with the present invention the sensitivity or detection range of each proximity switch P1–P4 is adjusted so that it has an extremely narrow range in the direction of movement of the conveyor. However, its range in a direction transverse to the movement of the conveyor should be broad enough to allow for slight transverse movement of the bottles within the case yet narrow enough to prevent erroneous detection of a bottle from an adjacent row. Thus, the sensing ranges should be separated sufficiently at the level of the bottle caps C so one cap cannot at the same time be sensed by two bottle sensing heads. It will be appreciated that the particular sensing apparatus here disclosed is merely by way of example and forms no part of the present invention.

In order to maintain the bottles within their respective sensing lanes as the case passes under sensing assembly 20, suitable case guide means 52 may be provided at the control station. Guide means 52 may comprise two parallel plates 54 mounted at either side of the conveyor by support means 56 and spaced from each other by a distance slightly greater than the width of case 13, said plates being flared at their inlet ends 58 for funneling cases through the control station (See FIG. 4).

CONTROL CIRCUIT

The control circuit of the present invention will now be described with reference to FIGS. 7 through 10. The general operation of the circuit is illustrated in block diagram form in FIG. 7. As there shown the bottle sensor assembly 20 provides an input to a counter generally designated 60. In accordance with the preferred embodiment herein described counter 60 is effective to register one count for each full row of bottles passing the bottle sensing assembly 20. That is, each time a bottle is sensed by all operative bottle sensing heads P as a row of bottles passes therebeneath, the bottle detector will provide the input necessary to register one count in counter 60. A switching circuit generally designated 62 is adapted to continually sense the count registered in counter 60 and upon receipt of a signal from the case detect means 18 indicating that a case has passed beyond the control station is adapted to provide a "missing bottle" output signal if the count registered in counter 60 is less than a predetermined number. That number is determined by the lane selector switch generally designated 64. In the preferred embodiment herein disclosed lane selector switch 64 has two operative positions, that corresponding to a four-lane case (e.g. 24 bottles) and that corresponding to a three-lane case (e.g. 12 bottles). In the three-lane position lane selector switch 64 is also adapted to render the bottle sensing head P4 inoperative.

An indicator generally designated 66 is adapted to be activated upon the sensing of a case which has one or more bottles missing therefrom. The term "indicator" as used herein includes any means adapted to actuate an alarm (visual or audible), stop the conveyor, or appropriately act on the thus detected case, as by ejecting it from the conveyor line or the like. Indicator 66 is operatively connected to switching circuit 62 and is adapted to be actuated thereby as a case leaves the control station if the count registered in counter 60 has not reached 4 or 6 (in the specific examples of FIGS. 1 or 2 respectively). To insure that indicator 66 is not activated until the case in question has fully passed the control station, indicator 66 is operatively connected to case detect means 18 and will only be activated upon simultaneous receipt of the appropriate signals from both switching circuit 62 (missing bottle) and case detect means 18 (case leaving).

A reset means generally designated 68 is also operatively connected to both the switching circuit 62 and the case detect means 18 and is adapted upon receipt of the appropriate "case leaving" signal from case detect means 18 to reset counter 60 to zero in preparation for the counting of the next case of bottles. However, if the counter 60 has not reached the required count at this time, switching circuit 62 is adapted to disable reset means 68. A reset override means generally designated 70 is provided for overriding the disabling effect of switching circuit 62 after a non-full case has been detected and appropriately treated. Thus, if indicator 66 is adapted to automatically eject the case in question reset override means 70 may be operatively connected thereto to automatically enable reset means 68 to again reset counter 60 to zero. Alternatively, reset override means 70 may be controlled by a manual switch requiring the operator to reset the counter after the detected non-full case has been appropriately treated.

It will be apparent from the foregoing that a case containing one or more missing bottles (regardless of the actual number) will be detected immediately upon leaving the control station and may automatically be appropriately acted upon without interruption of subsequent movement of cases through the control station.

FIG. 8 is a schematic circuit diagram illustrating the operative components of the control circuit in somewhat simplified form. As there shown the bottle detector circuit comprises four proximity switch contacts P1 through P4 connected in series across a power supply generally designated 80. In a preferred embodiment of the invention power supply 80 is a 24-volt D.C. supply. Contacts P1–P4 are operatively connected to their corresponding sensing heads shown in FIG. 5 and are adapted to be closed each time a bottle cap enters the sensing field of its corresponding proximity switch as previously described. A control relay designated A is connected in series with contacts P1–P4 across power supply 80 by means of lead line 81 and is adapted to be energized upon the application of a current through its associated coil. Control relay A is preferably a dry reed delay and operates in a known manner. Thus, when the coil of relay A is energized the relay is adapted to close the normally open contacts with which it is associated and open the normally closed contacts with which it is associated. As illustrated, a normally open contact A1 and a normally closed contact A2 are both operatively connected to control relay A and are accordingly controlled thereby. Contacts A1 and A2 are each connected across power supply 80, normally open contact A1 being interposed in lead line 82 and normally closed contact A2 being interposed in lead line 84.

Counter 60 shown enclosed within the broken line rectangle in FIG. 8 is a binary counter and comprises a plurality of flip-flop units (in this case three units, FF1, FF2 and FF3), operatively connected in the usual manner by means of lead lines 85 and 87 to form a binary counter. In the preferred embodiment, each flip-flop unit is a bi-stable switching device employing magnetically latched dry reed relays, each unit adapted to receive two input signals and a reset signal. One of input terminals of each flip-flop is operatively connected to lead line 84 by means of input lead lines IN1, IN2, and IN3. The other input terminal of said flip-flops are connected to lead lines 86, 85, and 87, respectively. Lead line 86 provides the operative input to the first flip-flop unit FF1 and lead lines 85 and 87 are adapted to apply the appropriate carry signals to flip-flop units FF2 and FF3, respectively.

An OR device B, hereinafter to be described in more detail, is operatively connected to lead lines 82 and 84 and is adapted to receive the signals therefrom as its two inputs. OR device B is operatively connected to a normally open contact B1 and a normally closed contact B2. If either lead line 82 or lead line 84 but not both are current-carrying OR device B will be effective to close normally open contact B1 and open normally closed contact B2. Contact B1 is connected in series between normally open contact A1 and flip-flop unit FF1 in lead line 86 connected to lead line 82 at node 88. Contact B2 is interposed in lead line 84 in series with normally closed contact A2. A diode 90 is interposed in lead line 92 connecting lead lines 84 and 82 at nodes 94 and 96, respectively. A second diode 98 is interposed in lead line 82 between nodes 88 and 96.

It will be appreciated from the foregoing that in the absence of a full row of capped bottles passing under proximity switches P1–P4, normally open contact A1 will remain open and normally closed contact A2 will remain closed. As a result, current will flow through lead line 84 and also through lead line 82 to the right of node 96 as a result of interconnecting lead line 92 and diode 90. Accordingly, both inputs to OR device B will be current-carrying and normally open contact B1 and normally closed contact B2 will remain in their open and closed states, respectively. Accordingly, current will not flow through lead line 86 to the input to flip-flop FF1 and thus no count will be registered therein.

Upon the passage of the first full row of capped bottles under the bottle sensing mechanism 20 contacts P1–P4 will be closed and relay A will be activated, closing contact A1 and opening contact A2. As a result current will continue to flow through lead line 82 but current will be cut off from lead line 84 by open contact A2 and diode 90. Accordingly, OR device B will be effective to open normally closed contact B2 and close normally open contact B1. As a result current will now flow through lead line 86 to FF1 which, if initially in the "0" state, will be cocked for toggling to the "1" state. As the first full row of capped bottles leaves the sensing field of proximity switches P1–P4 contacts P1–P4 will be momentarily opened, relay A will be deactivated returning contacts A1 and A2 to their normally open and closed states respectively. As a result OR device B receives current from neither lead line 82 nor lead line 84 (blocked by open contact B2) and contacts B1 and B2 now also return to their normally open and closed states, respectively. Thus, current will again flow through lead line 84, through diode 90 to node 96 and through lead line 82 to the right of node 96, thereby providing current to both inputs of OR device B to maintain it in its deactivated condition. In addition current now flows through input lead lines IN1–IN3 and flip-flop unit FF1 is thereby trigerred and toggles to the "1" state. The first count has now been registered.

It will be seen from the foregoing that current normally flows through lead line 84 and input lines IN1–IN3 to one input of flip-flops FF1–FF3, respectively. Each time a full row of capped bottles passes under bottle sensor assembly 20 current is cut off from lead line 84 and flows through lead line 82 and lead line 86 to provide the cocking input to the first flip-flop FF1. As a full row of bottles leaves the sensing field of bottle sensor assembly 20 current is again cut off from lead lines 82 and 86 and again flows through lead line 84 and input lead lines IN1–IN3. If flip-flops FF1–FF3 are initially set in the "0" state the first full row of capped bottles will thereby be effective to toggle flip-flop FF1 to the "1" state. In the same manner, the second full row of capped bottles will be effective to toggle flip-flop unit FF1 back to the "0" state. However, upon application of the second cocking signal to flip-flop FF1 via lead line 86, FF1 is effective to produce a carry signal which is applied as the input to flip-flop FF2 through lead line 85 thereby to cock flip-flop FF2 for toggling to the "1" state, whereupon application of the toggle signal via input lead line IN2 (as the second full row of bottles leaves the sensing field) is effective to toggle flip-flop FF2 to the "1" state as flip-flop FF1 returns to the "0" state. This process will continue in the usual manner, the three stage binary counter being effective to register one additional binary count for each full row of bottles passing under bottle sensing mechanism 20. This counting process is illustrated in tabular form in FIG. 9.

Referring again to FIG. 8 it will be seen that flip-flop units FF2 and FF3 are each associated with normally open contacts, said contacts designated FF2' and FF3' are in turn connected in series across power supply 80, contact FF3' being interposed in lead line 100 and contact FF2' being interposed in lead line 102. As hereinafter described in more detail, each is adapted to be closed each time its associated flip-flop unit is set to "1."

Lane selector switch 64 comprises two contacts 104 and 106 interposed in lead lines 102 and 100 respectively. In the four-lane position shown in FIG. 8 contact 104 is closed and contact 106 is open so that contacts FF2 and FF3 are operatively connected in series across the power supply. When the lane selector is switched to the three-lane position contact 106 closes and contact 104 opens. As a result contact FF2 is effectively cut out of the circuit, that is to say, its opening or closing or closing will have no effect on the other elements of the circuit. An additional contact 108 is also controlled by lane selector switch 64 and is adapted to be opened in the four-lane position (as shown) and closed in the three-lane position. A relay C is connected in series with contact 108 across power supply 80 by means of lead line 110 and is effective when actuated to close a normally open contact C1. Contact C1 is in turn interposed in a shunt line 112 in parallel with contact P4 and when closed is effective to shunt out the P4 contact associated with proximity switch P4.

Case detect mechanism 18 comprises photoelectric cell 44 which as shown is operatively connected to contacts 114 and 116. Contact 114 is connected in series with a relay D across power supply 80 by means of lead line 118, a diode 119 being interposed therebetween. Contact 116 is connected across power supply 80 by means of lead line 120 and is operatively connected in series with lead lines 100 and 102 by means of connecting lead line 122 connecting lead lines 100 and 120 at nodes 103 and 105, respectively. A second OR device E is operatively connected to lead lines 100 (to the right of contact FF3) and 120 and is adapted to receive the signals therefrom at its two inputs. A normally open contact E1 and a normally closed contact E2 are each operatively connected to OR device E and are adapted to be controlled thereby. Thus if either lead line 100 or lead line 120 but not both is current-carrying, OR device E will be effective to close normally open contact E1 and to open normally closed contact E2. Normally open contact E1 is disposed in lead line 100 in series with a diode 124 to the left of node 103. Normally closed contact E2 is disposed in a lead line 126 in series with a diode 128, lead line 126 connecting lead line 118 and lead line 84 at nodes 130 and 132, respectively. A lead line 134 is connected to lead line 126 between contact E2 and diode 128 at node 136 and serves to provide the reset inputs to flip-flop units FF1–FF3 by means of reset lead lines R1, R2 and R3, respectively. A relay F is connected in series with contact E1 (but in parallel with contacts FF2 and FF3) across power supply 80 by means of lead line 138 taken off lead line 100 between contact E1 and diode 124 at node 140, a diode 142 being disposed between node 140 and relay F. Indicator 66 is connected across power supply 80 in series with normally open contacts F1 and D1 by means of lead line 144, said contacts being controlled respectively by relay F and relay D.

The operation of the switching circuit will be apparent from the foregoing. (For purposes of illustration, lane selector switch 64 will be considered in the four-lane position as shown.) When a case is sensed by photocell 44 normally closed contact 114 is opened and normally open contact 116 is closed. As a result current flows through lead line 120 to OR device E. However, current is blocked through lead line 122, contact 104 and lead line 102 by normally open contacts FF2 and FF3. Accordingly, OR device E is effective to close normally open contact E1 and to open normally closed contact E2. Current now flows through lead line 100 to node 140 and thence through lead line 138 and diode 142 to relay F whereupon relay F is effective to close normally open contact F1. However, because contact 114 is open current does not flow through lead line 118, relay D is not activated and thus contact D1 remains open to block current flow through lead line 144. Accordingly, indicator 66 remains deactivated during the presence of a case at the control station.

As each full row of bottles disposed in the case passes under sensing heads P1–P4 one additional count is registered in counter 60 in the manner previously described. After the last row (sixth row) of a full 24-bottle case passes under sensing heads P1–P4 the count registered in counter 60 corresponds to 6 in the binary number system (110); that is, flip-flop FF1 is in the "0" state and flip-flops FF2 and FF3 are in the "1" state (see FIG. 9). Accordingly, both of normally open contacts FF2 and FF3 are closed, current flows through closed contact 116, lead line 122, contact 104 and lead line 102 to OR device E. Since both inputs to OR device E are now current-carrying, normally closed contact E2 and normally open contact E1 return to their normal states; relay F is deactivated, contact F1 opens, relay D remains deactivated, and contact D1 remains open.

As the case leaves the control station photocell 44 is effective to again close contact 114 and open contact 116 (as shown) whereby current now flows through lead line 118 and diode 119 to activate relay D, thereby to close normally open contact D1. However, as a result of open contacts E1 and 116 current continues to be blocked through lead lines 122, 120 and 102 to both inputs to OR device E. In addition, current is still blocked through lead line 138, diode 132 to relay F. Normally open contacts E1 and F1 thus remain in their normally open states and indicator 66 is thus not activated. In addition, contact E2 remains in its normally closed state. At the same time, upon the closing of contact 114 current begins to flow from lead line 118 through closed contact E2, node 136 and lead line 134 to reset lead lines R1 through R3 thereby to reset all flip-flop units FF1 through FF3 to their initial "0" states in preparation for the entry of the next case at the control station.

If upon the actuation of photocell 44 to close contact 114 and open contact 116 as a case leaves the control station, the count registered in counter 60 has not reached the binary 6 count shown in FIG. 9, the following will take place: After the last row of bottles passes, current continues to be blocked through lead line 122, contact 104 and lead line 102 by either contact FF2 or FF3 or both and OR device E is effective to maintain normally open contact E1 closed and to maintain normally closed contact E2 open. Current continues to flow through lead line 100 to node 140 and thence through lead line 138, diode 142 to relay F thereby to close normally open contact F1. Contact D1, however, remains open to block current flow through lead line 144 as a result of open contact 114.

As the case leaves the control station photocell 44 is again effective to close contact 114 and open contact 116 (as shown); current flows through lead line 118, diode 119 to activate relay D thereby to close normally open contact D1. However, since the count has not reached the required binary number (6) either one or both of contacts FF2 or FF3 have remained open and contact E1 just prior to the opening of contact 116 has remained closed providing a current source through diode 124, node 103 and lead line 122 to lead line 120. Accordingly, upon the opening of contact 116 current continues to flow through lead line 120 to one input of OR device E and current continues to be blocked by either contact FF2 or FF3 or both to the other input of OR device E. As a result, contact E1 continues in its closed position and contact E2 continues in its open position; current continues to flow through lead line 100, contact E1 to node 140 and thence through lead line 138, diode 142 to relay F thereby closing contact F1. As previously noted contact D1 is also closed and thus current now flows through lead line 144 through closed contacts F1 and D1 and indicator 66 is activated. At the same time, by virtue of open contact E2 current is blocked to the reset lead lines R1-R3 and counter 60 is thus not reset to "0."

As previously noted, indicator 66 may comprise an alarm, for instance, in the form of a horn or light source in which case the terminals thereof would merely be connected in series with contacts F1 and D1 across power supply 80. When the alarm is sounded or lit, as the case may be, the case is merely removed from the conveyor belt and the counter may be manually reset to "0." For this purpose reset override 68 is adapted to control two contacts. Normally open contact 152 is disposed in a lead line 154 connected between power supply 80 and node 136 in series with lead line 134. Normally closed contact 156 is interposed in lead line 100 between power supply 80 and normally open contact E1. When reset override 68 is activated contact 152 is closed thereby providing current to lead line 134 and reset lead lines R1-R3 and is thus effective to reset counter 60 to "0." At the same time contact 156 is opened thereby blocking current through lead line 100, contact E1, node 140, lead line 138 and diode 142 to relay F. Accordingly, contact F1 is returned to its normally open position and indicator 66 is deactivated, OR device E is deactivated and contact E1 is returned to its normally open position. (It will be noted that when contact 116 is open—no case at control station—contact E1 is stable in either its closed or open state.)

COUNTER OPERATION

Figure 10:
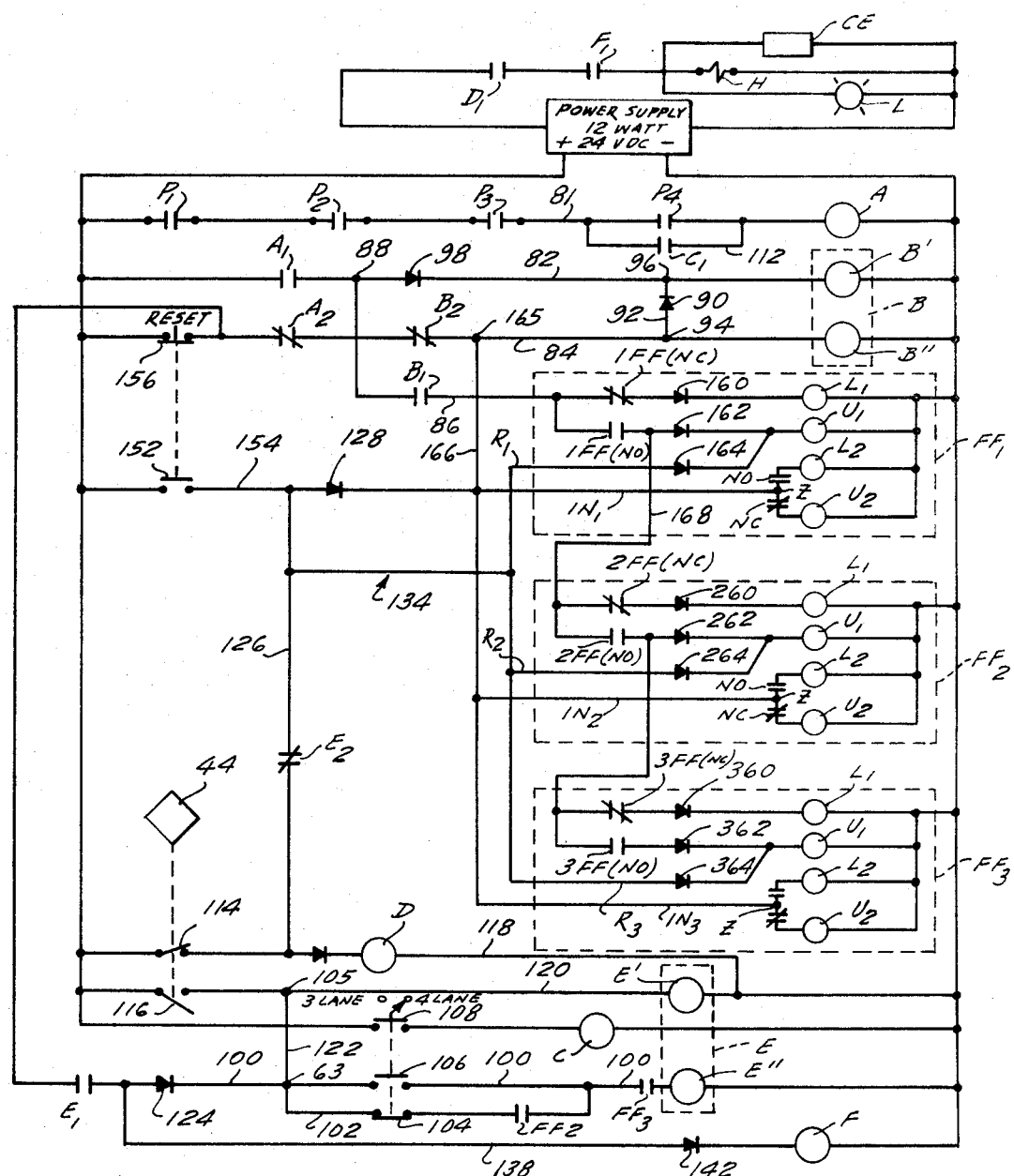
FIG. 10 is a complete circuit diagram of the control circuit of the present invention illustrating with still more particularity the operation of the present invention.

The operation of counter 60 will now be explained in more detail with reference to FIG. 10 which is a complete circuit diagram of the control circuit of the present invention, like reference numerals being applied to like components. As there shown the components of each flip-flop unit FF1 through FF3 are enclosed within a broken line rectangle and comprises a dry reed flip-flop unit having a normally open contact NO and a normally closed contact NC, an input relay latch coil L1 and an output relay latch coil L2, an input relay unlatch coil U1 and an output relay unlatch coil U2. Contacts NO and NC are connected in series, the input lead lines IN1 through IN3 being operatively connected to both contacts at nodes Z therebetween. Output latch coil L2 is connected to the other terminal of contact NO and is thus in series therewith across power supply 80. Output unlatch coil U2 is connected to the other terminal of contact NC and is thus in series therewith across power supply 80. Input latch coil L1 is connected in series with a normally closed contact 1FF (NC) and input unlatch coil U2 is connected in series with a normally open contact 1FF (NO), contacts 1FF (NC) and 1FF(NO) being connected in parallel with each other and in series with normally open contact B1 interposed in lead line 86 taken off lead line 82 at node 88, as previously described.

OR devices B and E are enclosed within broken line rectangles and each comprises a dry reed logic unit having two relay coils wound such that they oppose each other when energized. Two relay coils B' and B" are interposed in lead lines 82 and 84, respectively. Coils E' and E" are interposed in lead lines 120 and 100, respectively. Thus, if one or the other but not both of relays B' and B" are activated (by current passing through the coil thereof) normally open contact B1 will be closed and normally closed contact B2 will be opened.

Accordingly, when the first complete row of bottles passes under sensing heads P1-P4 contacts A1 and B1 are closed, current passes via node 88, lead line 86 and contact B1 through contact 1FF (NC), diode 160 and thence to input relay coil L1 of flip-flop FF1. Relay coil L1 is effective when energized to close normally open contact NO and to open normally closed contact NC and latch those contacts in such position. When the first complete row of bottles passes out of the sensing field of sensing hands P1-P4, relay A is momentarily de-energized returning contacts A1 and A2 to their normally open and closed states, respectively. As a result, current now passes through normally closed reset contact 156, contact A2, contact B2, via node 165 and lead line 166 to input lead lines IN1 through IN3. Current thus flows through contact NO of flip-flop FF1 which has been latched closed by input relay coil L1 and on to the output relay coil L2 of flip-flop FF1. Relay coil L2 in turn is effective, when energized, to open normally closed contact 1FF (NC) and to close normally open contact 1FF (NO). At this point the first count has been entered, i.e. flip-flop unit FF1 is now in the "1" state. As the second complete row of bottles is sensed relay A is again energized closing contact A1 and opening contact A2. Current now passes through contact A1, diode 98 and relay B'. As before relay B" is not energized (current being blocked by contact A2 and diode 90) and thus contact B1 closes allowing current to flow from node 88 through lead line 86 and thence through contact 1FF (NO) (which it will be recalled has been latched closed) and diode 162 to input relay coil U1 of flip-flop unit FF1. Input relay coil U1 is effective when energized to unlatch the input relay contacts NO and NC so that they now return to their normal positions. At the same time current flows through lead line 168 to contact 2FF (NC), and thence through diode 260 to input relay coil L1 of flip-flop unit FF2 which in turn closes normally open contact NO and opens normally closed contact NC of flip-flop unit FF2. Again as the second complete row leaves the sensing field of sensing heads P1-P4 relay A is momentarily de-energized and current passes through normally closed reset contact 156, contact A2, contact B2, relay B", diode 90 and relay B'. Since the coils of both relays B' and B" are energized contacts B1 and B2 return to their normally open and closed positions and current passes through contact B2, via node 165 and lead line 166 to lead lines IN1-IN3. The current in IN1 passes through contact NC (which is now latched closed) to output relay coil U2 of flip-flop unit FF1 which when energized is effective to return contacts 1FF (NC) and 1FF (NO) to their normal positions thereby toggling flip-flop unit FF1 back to the "0" state. At the same time the current in input lead line IN2 passes through contact NO which it will be recalled has now been latched closed and thence to output relay coil L2. Again relay coil L2 when energized is effective to close normally open contact 2FF (NO) and open normally closed contact 2FF(NC) and latch such contacts in these positions thereby toggling flip-flop unit FF2 to the "1" state. Thus upon passage of the second complete row of bottles flip-flop unit FF1 has returned to the "0" state and flip-flop unit FF2 has toggled to the "1" state, as illustrated in tabular form in FIG. 9.

It will be apparent from the foregoing that each time a full row of bottles enters and leaves the sensing field of sensing heads P1-P4 an additional binary count will be entered into the three-stage counter comprising flip-flop units FF1 through FF3. Thus, after the 6th complete row of bottles has passed beyond the sensing field of sensing heads P1-P4 flip-flop unit FF1 will be in the "0" state and flip-flop units FF2 and FF3 will both have toggles to the "1" state (see FIG. 9). In other words, both contacts 2FF (NO) and 3FF (NO) will be latched closed. It will be recalled that normally open contacts FF2 and FF3 disposed in lead lines 102 and 100, respectively, are operatively connected to flip-flop units FF2 and FF3, respectively, are operatively connected to flip-flop units FF2 and FF3, respectively, and are responsive to the counts registered therein. It will now be appreciated that contact FF2 is controlled by the same latch and unlatch relays as contact 2FF (NO) (L2 and U2 of flip-flop FF2) and contact FF3 is controlled by the same latch and unlatch relays as contact 3FF (NO) (L2 and U2 of flip-flop FF3). Accordingly, as flip-flop unit FF2 toggles to the "1" position (contact 2FF (NO) latched closed) contact FF2 closes and as flip-flop unit FF3 toggles to the "1" position (contact 3FF (NO) latched closed) contact FF3 closes thereby to provide a conductive path (lead lines 102, 100) to relay coil E''. As previously noted, contact 116 remains closed until the case leaves the control station. Accordingly, if the count at this time registered in the counter 60 has reached "6", both coils E' and E'' are energized and contact E1 remains in its normally open position. When contact 116 is subsequently opened current is cut off from both lead line 120 and lead line 100 and both coils E' and E'' are de-energized so that contact E1 continues to remain in its normally opened position and relay F remains unenergized. Thus, contact F1 remains open and indicator 66 is unenergized. In addition, contact E2 remains closed and current flows via lead lines 126, 134, R1-R3 and diodes 164, 264 and 364 to the input unlatch coils U1 of all flip-flop units thereby to return all contacts 1FF-3FF to their normal positions resetting all flip-flops to the "0" state.

If, on the other hand, the count in counter 60 had not reached "6" prior to the opening of contact 116, current would be blocked to relay coil E'' and contact E1 would accordingly be closed. Upon the subsequent opening of contact 116 current would flow through contact E1, diode 124, node 103, lead line 122 and lead line 120 to energize relay coil E'. However, relay coil E'' remains unenergized as a result of either or both of contacts FF2 and FF3 remaining open. Contact E1 thus remains closed and current flows through lead line 138 and diode 142 to energize relay F. At the same time relay D has been energized by the closing of contact 114. Thus both contacts F1 and D1 are closed, current flows through lead line 144 and indicator 66 is activated. In addition, contact E2 remains open to prevent resetting of flip-flop units FF1-FF3 to the "0" state.

It will be appreciated from the foregoing that the circuitry may be readily modified to be responsive to cases having any number or rows and/or lanes. In the embodiment illustrated, lane selector 64 is adapted to modify the circuitry to accommodate a 12-bottle case having four rows of three bottles each. Thus, as lane selector switch 64 is set to the three-lane position, contact 104 opens and contacts 106 and 108 close. As a result, current at node 103 no longer is directed through lead line 102 to contact FF2 but is now adapted to go through lead line 100 directly to contact FF3 bypassing contact FF2. At the same time the coil of relay C is continuously energized and is thus effective to close normally open shunt contact C1 in shunt line 112 thereby to effectively bypass contact P4. In accordance with the foregoing each time a full row (3) of bottles passes under sensing heads P1-P3 an additional count is registered in counter 60. After the fourth complete row has passed flip-flops FF1-FF3 are in the "0" "0" and "1" states respectively corresponding to a binary count of "4." Accordingly, contact FF3 is closed and current flows through lane selector contact 106 to OR device E. Upon opening of contact 116 as a case leaves the control station current is cut off from both inputs to OR device E, contact E1 remains open, relay F remains unenergized, contact F1 remains open and indicator 66 remains unactivated. On the other hand, if the count has not reached "4" prior to the opening of contact 116 contact FF3 will remain open, OR device E receiving current from only one input (lead line 120), and contact E1 will be closed. Upon the opening of contact 116, current will continue to flow through contact E1, diode 24, node 103, lead line 122 and lead line 120 to one input of OR device E which in turn maintains contact E1 closed. As a result current flows through lead line 138, relay F is energized and contact F1 is closed. Again as a result of the closing of contact 114 relay D will be energized and contact D1 will be closed. Thus current flows through lead line 144 and indicator 66 (horn H and/or light L and/or case eject mechanism CE; see upper portion of FIG. 10) is activated.

The reset override mechanism 70 may if desired be adapted for automatic operation in combination with a particular indicator means effective to appropriately deal with a case having one or more missing bottles. For example, in addition to providing a visible and/or audible alarm indicator 66 may be adapted to shunt a case off the conveyor track by appropriate mechanical means whereupon appropriately positioned limit switches may be adapted to momentarily open contact 156 and close contact 152 thereby to automatically reset the counter and open contact E1 when the case has sufficiently cleared the conveyor means.

In accordance with the foregoing, the present invention provides control apparatus and circuitry adapted to rapidly and accurately sense a missing bottle or bottles in cases moving along a shipping line or conveyor means. The apparatus is completely automatic and extremely versatile in that it may be readily adapted for use with containers of various sizes and shapes and cases of varying capacity. Moreover, a standardized construction provides for adjustable positioning of the various operative parts, so that it can be used in a wide variety of different pre-existing factory installations. The circuitry is readily adapted to provide the required indication of a missing container as a case passes completely beyond the control station so that such case may be appropriately dealt with without undue interference with the control apparatus at the control station. The circuitry utilizes standard inexpensive commercially available components, which are easily and rapidly replaced. As a result maintenance cost is low and down time is minimized.

While only a single preferred embodiment of the present invention is herein specifically described, it will be appreciated that many variations may be made therein all within the scope of the present invention as defined in the following claims.

I claim:

1. A control apparatus for detecting a missing article in a group of articles moving past a control station, said group normally comprising a given number of articles, said apparatus comprising means to detect the presence of said group of articles at said control station and effective to produce a group detect signal during the interval when said group is present at said control station, means to detect individual articles of said group as said group moves past said control station, means operatively connected to said article detect means and responsive to said group detect signal for counting the number of articles passing said control station, indicating means, and actuating means operatively connected to said counting means, responsive to said group detect signal and effective upon the termination of said group detect signal to actuate said indicating means if the number of articles counted is less than said given number thereby to indicate the presence of a group comprising less than said given number of articles, said article detect means comprising a plurality of article sensors, a plurality of first switching devices operatively connected respectively to said plurality of article sensors and adapted to be actuated by same, means for registering a count in said counter in response to the actuation of all of said plurality of first switching devices corresponding to the passage of N articles, where N is an integer and said given number is a multiple of N, said indicating means being actuated upon the termination of said group detect signal if the count registered by said counting means is less than said given number divided by N, further comprising a power source, said plurality of said first switching devices being operatively connected across said power source and a first control relay operatively connected in series with said plurality of said first switching devices and effective upon actuation thereof to register one count in said counter means.

2. The control apparatus of claim 1, further comprising means responsive to said counter means for resetting said counter means upon termination of said group detect signal if the count registered in said counter means has reached said given number divided by N.

3. The control apparatus of claim 1, wherein said article detecting means comprises a plurality of proximity limit switches disposed substantially transversely to the direction of movement of said group and aligned respectively with said plurality of lanes.

4. The control apparatus of claim 3, wherein said counter means is a digital binary counter comprising a plurality of flip-flops.

5. The control apparatus of claim 1, wherein said counter means is a digital binary counter comprising a plurality of flip-flops.

6. The control apparatus of claim 1, wherein said actuating means comprises first switch means responsive to the count of said counter means and second switch means responsive to said group detect means and relay means responsive to said first and second switch means for actuating said indicating means.

7. The control apparatus of claim 6, wherein said first switch means comprises a plurality of second switching devices connected in series, and all adapted to be closed in response to a predetermined count in said counter means and wherein said second switching means comprises a normally open third switching device adapted to be closed during the interval when a group is detected thereby to produce said group detect signal, said relay means being actuated when at least one of said plurality of second switching devices is open and said third switching device is open.

8. A control circuit for sensing a missing article in a group of articles moving past a control station and providing an indication thereof, including means for detecting the presence of said group at said control station and means for detecting individual articles in said group as they pass said control station, said control circuit comprising first switch means adapted to be actuated by said article detecting means and effective when actuated to produce an article detect signal, second switch means adapted to be actuated by said group detecting means and effective when actuated to produce a group detect signal during the interval in which a group is detected, counter means, third switch means operatively connected to said counter means and said first switch means for receiving said article detect signals and effective to register an additional count in said counter means for every article detect signal received, indicating means for indicating the presence of a group having less than the required number of articles therein, fourth switch means operatively connected to said second switch means and said counter means and effective to actuate said indicating means upon termination of said group detect signal when the count registered by said counter means is less than a predetermined number, and reset means operatively connected to said second switch means and said fourth switch means for automatically resetting said counter means upon termination of said group detect signal when the count registered by said counter means corresponds to said predetermined number.

9. The control circuit of claim 8, further comprising a power source, said first switch means comprising a plurality of first switching devices connected in series across said power source, a first control relay connected in series with said plurality of first switching devices across said power source and adapted to be actuated upon the closing of all of said plurality of first switching devices, said third switch means being responsive to said control relay and effective when actuated to register a count in said counter means.

10. The control apparatus of claim 9, wherein said reset means comprises second and third normally closed switching devices connected in series and effective when both are closed to reset said counter means, said second switching device being operatively connected to said group detect means and adapted to be opened during the interval in which a group is detected, fifth switch means operatively connected to said counter means and responsive to the count registered therein, and relay means operatively connected to said second switch means and said fifth switch means and effective when both are open or closed to open said third switching device thereby to prevent said reset means from resetting said counter means.

11. In a shipping line wherein packages containing articles arranged in intersecting rows and columns are moved along a conveyor means, a control apparatus for detecting packages having less than the required number of articles, comprising package detect means responsive to the presence of a package at said control station, and effective to produce a package present signal upon a package entering said control station, said package present signal terminating upon a package leaving said control station, means for detecting each full row of articles as said package passes said control station, counter means, first switching means responsive to said row detect means and effective to enter a count in said counter means for each full row detected thereby, indicator means, and second switching means responsive to the count in said counter and said package present signal, and effective to actuate said indicating means at the termination of said package present signal if the count in said counter has not reached a predetermined number corresponding to the number of full rows in a full package, wherein said row detect means comprises a plurality of article detect switches disposed at said control station adjacent each of said plurality of columns respectively and adapted to be actuated each time an article passes said control station, a power source, said plurality of article detect switches being connected in series across said power source and first relay means connected in series with said article detect switches and effective when actuated to actuate said first switch means.

12. The control apparatus of claim 11, further comprising means responsive to said package detect means for automatically resetting said counter means upon a package leaving said control station.

13. The control apparatus of claim 12, wherein said package detect means is effective to produce a package not present signal upon a package leaving said control station, said package not present signal being non-overlapping with said package present signal and wherein said automatic reset means is responsive to said package not present signal.

14. The control apparatus of claim 12, wherein said second switching means is effective to disable said automatic reset means at the termination of said package present signal if the count in said counter means has not reached said predetermined number.

15. The control apparatus of claim 14, further comprising reset override means effective when actuated to override said second switching means thereby to reset said counter regardless of the count registered therein and/or the presence of said package present signal.

16. The control apparatus of claim 12, wherein said second switching means is effective to disable said automatic reset means at the termination of said package present signal if the count in said counter means has not reached said predetermined number.

17. The control apparatus of claim 16, further comprising reset override means effective when actuated to override said second switching means thereby to reset said counter regardless of the count registered therein and/or the presence of said package present signal.

18. The control apparatus of claim 17, wherein said indicator means comprises means effective when actuated to eject a package from said conveyor means.

19. The control apparatus of claim 18, wherein said package eject means is effective to actuate said reset override means upon the ejection of a package from said conveyor means.

20. The control apparatus of claim 11, wherein said indicator means comprises means effective when actuated to sound an alarm.

21. The control apparatus of claim 20, wherein said indicator means further comprises means effective when actuated to stop said conveyor means.

22. The control apparatus of claim 11, wherein said indicator means comprises means effective when actuated to eject a package from said conveyor means.

23. The control apparatus of claim 11, wherein said first switch means comprises first and second switching devices connected in parallel across said power source and controlled by said first relay means and wherein said counter means comprises a binary counter having a plurality of flip-flops operatively serially connected, said first flip-flop being operatively connected to said first switching device for receiving the output therefrom and said plurality of flip-flops all being operatively connected to said second switching device for receiving the output therefrom.

24. The control apparatus of claim 23, wherein said second switching means comprises a plurality of counter switching devices connected in series across said power source, a first package detect switching device connected in parallel with said counter switching devices and being responsive to said package detect means and being adapted to be closed during the presence of a package at said control station, said plurality of counter switching devices each being operatively connected respectively to a different one of said flip-flops and being responsive to the state thereof, second relay means operatively connected to said first package detect switching device and said plurality of counter switching devices and effective when said first package detect switching device is open and said plurality of counter switching devices are closed to actuate said indicating means.

25. The control apparatus of claim 24, further comprising means responsive to said package detect means for automatically resetting said counter means upon a package leaving said control station.

26. The control apparatus of claim 25, wherein said second relay means is effective to disable said automatic reset means when said first package detect switching device is open and said plurality of counter switching devices are closed.

27. The control apparatus of claim 26, wherein said automatic reset means comprises a second package detect switching device adapted to be closed during the absence of a package at said control station and a normally closed reset switch adapted to be opened by said second relay means, said reset switch being connected in series between said second package detect switching device and said counter means.

28. A control apparatus for detecting a missing article in a group of articles moving past a control station, said group normally comprising a given number of articles, said apparatus comprising means to detect the presence of said group of articles at said control station and effective to produce a group detect signal during the interval when said group is present at said control station, means to detect individual articles of said group as said group moves past said control station, means operatively connected to said article detect means and responsive to said group detect signal for counting the number of articles passing said control station, indicating means, and actuating means operatively connected to said counting means, responsive to said group detect signal and effective upon the termination of said group detect signal to actuate said indicating means if the number of articles counted is less than said given number thereby to indicate the presence of a group comprising less than said given number of articles, wherein said actuating means comprises first switch means responsive to the count of said counter means and second switch means responsive to said group detect means and relay means responsive to said first and second switch means for actuating said indicating means, wherein said first switch means comprises a plurality of second switching devices connected in series, and all adapted to be closed in response to a predetermined count in said counter means and wherein said second switching means comprises a normally open third switching device adapted to be closed during the interval when a group is detected thereby to produce said group detect signal, said relay means being actuated when at least one of said plurality of second switching devices is open and said third switching device is open.

29. The control apparatus of claim 28, wherein said counter means is a digital binary counter comprising a plurality of flip-flops.

30. The control apparatus of claim 29, wherein each of said second switching devices is operatively connected to a different one of said flip-flops for actuation thereby.

* * * * *